(12) United States Patent
Trimmel

(10) Patent No.: US 11,398,324 B2
(45) Date of Patent: Jul. 26, 2022

(54) MULTIPLE PARALLEL CONDUCTOR WITH SPACER PLATES

(71) Applicant: ASTA ELEKTRODRAHT GMBH, Oed/Wiener Neustadt (AT)

(72) Inventor: Thomas Trimmel, Grimmenstein (AT)

(73) Assignee: ASTA ELEKTRODRAHT GMBH, Oed/Wiener Neustadt (AT)

( * ) Notice: Subject to any disclaimer, the term of this patent is extended or adjusted under 35 U.S.C. 154(b) by 0 days.

(21) Appl. No.: 17/251,390

(22) PCT Filed: Jun. 7, 2019

(86) PCT No.: PCT/EP2019/064940
§ 371 (c)(1),
(2) Date: Dec. 11, 2020

(87) PCT Pub. No.: WO2019/238558
PCT Pub. Date: Dec. 19, 2019

(65) Prior Publication Data
US 2021/0319930 A1   Oct. 14, 2021

(30) Foreign Application Priority Data

Jun. 12, 2018  (AT) .............................. A 50465/2018

(51) Int. Cl.
*H01B 7/30* (2006.01)
*H02K 3/04* (2006.01)

(52) U.S. Cl.
CPC .............. *H01B 7/306* (2013.01); *H02K 3/04* (2013.01)

(58) Field of Classification Search
CPC ........... H02K 3/00; H01F 27/28; H01F 41/06; H01B 7/306
See application file for complete search history.

(56) References Cited

U.S. PATENT DOCUMENTS 5,167,063 A * 12/1992 Hulsink ................ H01F 27/322
                                                              242/445
5,962,945 A * 10/1999 Krenzer ................ H01F 27/323
                                                              174/10

(Continued)

FOREIGN PATENT DOCUMENTS

CH         635 701         4/1983
CN       205122221         3/2016

(Continued)

OTHER PUBLICATIONS

Austria Search Report conducted in counterpart Austria Appln. No. A 50465/2018 (dated Jan. 21, 2019).

(Continued)

*Primary Examiner* — Chau N Nguyen
(74) *Attorney, Agent, or Firm* — Greenblum & Bernstein, P.L.C.

(57) ABSTRACT

A multiple parallel conductor that is easy to produce and use and has a plurality of twisted, insulated individual conductors. The individual conductors are arranged above one another in a plurality of sub-conductor bundles arranged next to one another. A strip is applied to the multiple parallel conductor on a side surface of the multiple parallel conductor in the longitudinal direction of the multiple parallel conductor, on which strip spacer plates are arranged so as to be distributed in the longitudinal direction, and the multiple parallel conductor together with the strip and the spacer plates is wrapped with a wrapping.

5 Claims, 3 Drawing Sheets

(56) References Cited

U.S. PATENT DOCUMENTS

| | | | |
|---|---|---|---|
| 9,153,359 B2 | 10/2015 | Trimmel et al. | |
| 2014/0062647 A1 | 3/2014 | Trimmel et al. | |
| 2017/0234340 A1* | 8/2017 | Pensak | A41F 1/002 |
| | | | 24/3.1 |

FOREIGN PATENT DOCUMENTS

| | | | |
|---|---|---|---|
| DE | 24 10 458 | | 9/1974 |
| DE | 2 316 830 | | 10/1974 |
| DE | 42 43 090 | | 7/1994 |
| DE | 10337153 | * | 3/2005 |
| EP | 0 874 373 | | 10/1998 |
| GB | 1103764 | | 2/1968 |
| WO | 94/07251 | | 3/1994 |
| WO | 95/15569 | | 6/1995 |
| WO | 95/30991 | | 11/1995 |
| WO | 12/113851 | | 8/2012 |
| WO | 12/113853 | | 8/2012 |

OTHER PUBLICATIONS

Int'l Search Report (Form PCT/ISA/210) conducted in Int'l Appln. No. PCT/EP2019/064940 (dated Oct. 9, 2019).
Int'l Written Opinion Report (Form PCT/ISA/237) conducted in Int'l Appln. No. PCT/EP2019/064940 (dated Oct. 9, 2019).
Int'l Preliminary Examination Report (Forms PCT/IB/338 & 409) conducted in Int'l Appln. No. PCT/EP2019/064940 (dated Oct. 9, 2019) (translation).

* cited by examiner

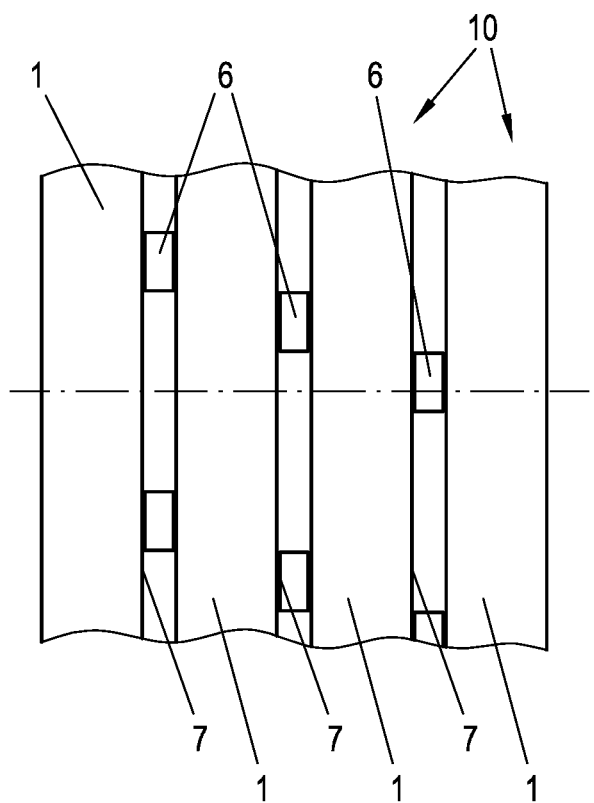
Fig. 5 Axial direction

MULTIPLE PARALLEL CONDUCTOR WITH SPACER PLATES

BACKGROUND

1. Field of the Invention

The present invention relates to a multiple parallel conductor comprising a plurality of twisted, insulated individual conductors, the individual conductors being arranged above one another in a plurality of sub-conductor bundles arranged next to one another. The invention further relates to a method for producing such a multiple parallel conductor and the use of the multiple parallel conductor in a winding of an electrical machine.

2. Description of Background

What are referred to as continuous multiple parallel conductors are often used for producing windings for electrical machines, such as transformers. Such multiple parallel conductors consist of a large number of individual, enameled individual conductors which are arranged next to one another in a plurality of individual conductor bundles, the individual conductors of individual conductor bundles arranged next to one another being twisted according to a predetermined pattern. Essentially, during the twisting, the uppermost and lowermost individual conductors of an individual conductor bundle in each case switch in the opposite direction into the relevant adjacent single conductor bundle at predetermined intervals, as a result of which said individual conductors cross over one another and the number of individual conductors in the different individual conductor bundles remains the same. The multiple parallel conductor is often provided with an outer wrapping, for example a bundle insulation, for example in the form of a paper wrapping or a mesh strip wrapping, for mechanical protection and stability or for insulating the multiple parallel conductor. Multiple parallel conductors are produced in large lengths and wound onto rolls. For processing, said multiple parallel conductors are unwound from the roll and supplied to a processing process. A wrapping, in particular a paper wrapping, can also be removed prior to use. Such multiple parallel conductors are known, for example, from WO 95/30991 A1 or EP0874373 B1.

In order to produce a winding from a multiple parallel conductor, the multiple parallel conductor is arranged in a known manner in a plurality of winding turns which are arranged next to one another in the axial direction and above one another radially, in order to form the winding of the electrical machine. In the axial direction, spacer plates made of electrically insulating material are often inserted between multiple parallel conductors arranged next to one another, in order to form a defined cooling channel in the winding. In a transformer winding, transformer oil is passed through the cooling channels during operation, for example, in order to cool the winding. During the winding process, said spacer plates are inserted between the multiple parallel conductors manually, which is complex and slows down the winding process considerably.

Arranging the spacer plates directly on the multiple parallel conductor is therefore already known from WO 94/07251 A1. In this case, a spacer plate is arranged on the side of the multiple parallel conductor at regular intervals in the longitudinal direction of the multiple parallel conductor during the production of the multiple parallel conductor and is held on the multiple parallel conductor by a mesh strip. As a result, the time-consuming manual insertion of the spacer plates during the production of the winding can be eliminated, which significantly reduces the production time for the winding. The use of spacer plates resting loosely on the multiple parallel conductor, however, makes the production and also the processing more difficult, since the spacer plates can easily slip. WO 94/07251 A1 therefore also suggests using a mesh strip which is pre-impregnated with partially cross-linked epoxy resin for wrapping, which mesh strip cures after a heat treatment and thus ensures the stability required for handling the multiple parallel conductor. The spacer plates are also fixed in position as a result. The use of such an impregnated mesh strip of course increases costs and also increases the production complexity due to the additional heat treatment. If nothing else, problems can also arise during the winding of the multiple parallel conductor on a roll or during the production of the winding of the electrical machine as a result of the cured epoxy resin, since the spacer plates integrated in the resin can make it more difficult to bend the multiple parallel conductor.

SUMMARY

It is therefore an aim of the present invention to provide a multiple parallel conductor having spacer plates that is easy to produce and can be further processed reliably and easily.

This aim is achieved according to the invention in that a strip is applied to a side surface of the multiple parallel conductor in the longitudinal direction of the multiple parallel conductor, spacer plates being arranged on the strip so as to be distributed in the longitudinal direction, and the multiple parallel conductor, together with the strip and the spacer plates, being wrapped with a wrapping. The arrangement of the spacer plates on a strip considerably simplifies the production of the multiple parallel conductor, since individual spacer plates no longer have to be processed. In addition, the strip also ensures that the spacer plates on the multiple parallel conductor can no longer move in an uncontrolled manner, which means that a curing wrapping does not necessarily have to be used. On the contrary, the spacer plates on the strip, which rest loosely on the multiple parallel conductor, can adapt to the curvature of the winding during the winding process, such that the spacer plates automatically remain substantially radially aligned.

Further features and advantages of the multiple parallel conductor according to the invention can be found in the following description of advantageous embodiments.

BRIEF DESCRIPTION OF THE DRAWINGS

The present invention is described in greater detail below with reference to FIG. 1 to 5, which show exemplary, schematic and non-limiting advantageous embodiments of the invention. In the drawings:

FIG. 5 is a schematic showing of winding turns that are arranged next to one another in the axial direction of the winding.

DETAILED DESCRIPTION

Figure 1:
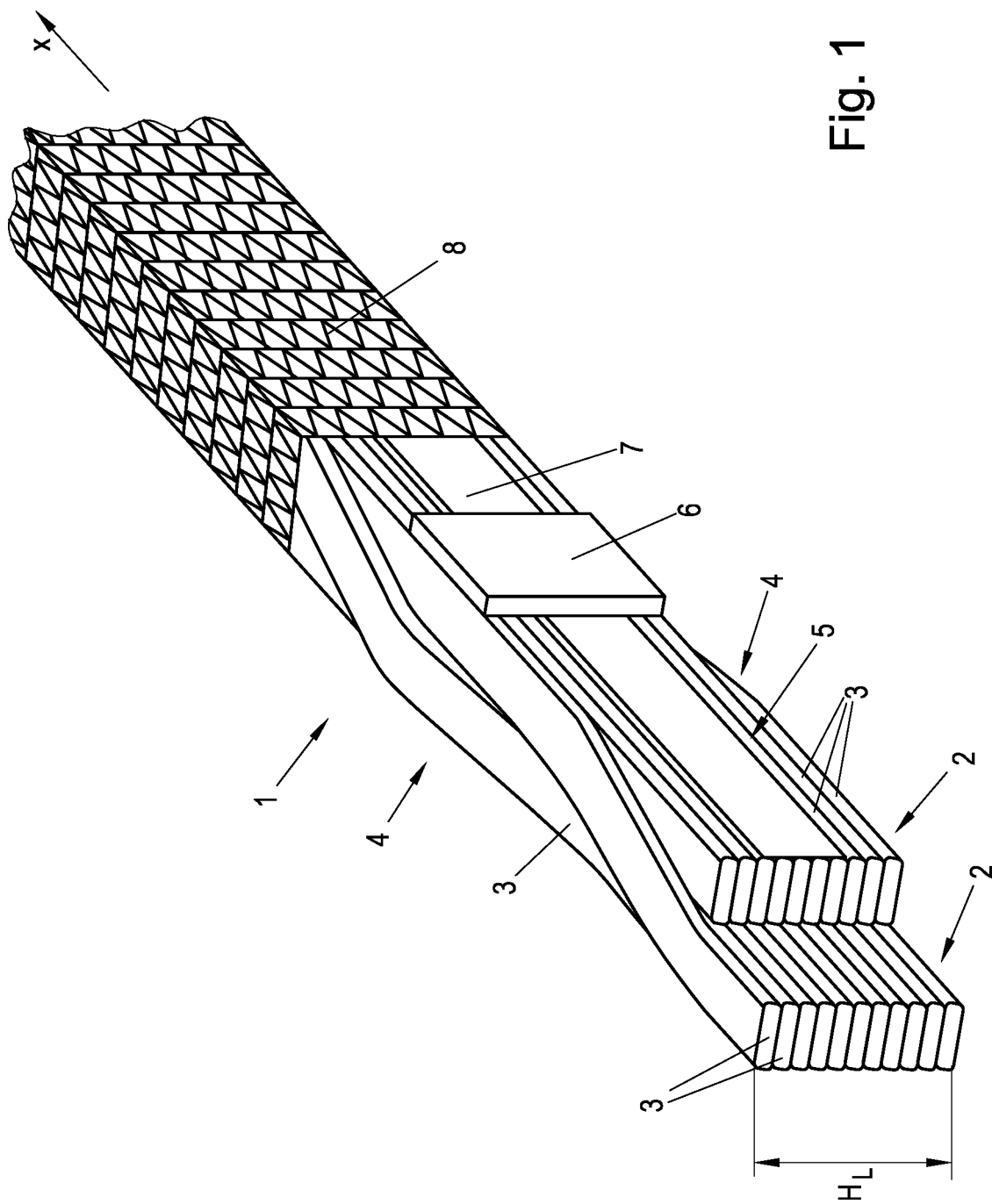
FIG. 1 shows a multiple parallel conductor according to the invention having spacer plates.

FIG. 1 shows an embodiment of a multiple parallel conductor 1 according to the invention, which consists of a plurality of, in this case two, individual conductor bundles 2 arranged next to one another. A plurality of insulated, preferably enameled, individual conductors 3 are arranged above one another in each individual conductor bundle 2. The individual conductors 3, or the individual conductor bundles 2, extend in the longitudinal direction x over the length of the multiple parallel conductor 1. An individual conductor 3 usually has a rectangular cross section, the individual conductors 3 resting against one another on the longitudinal sides of the rectangular cross section in a single conductor bundle 2.

It should be mentioned, however, that an individual conductor 3 itself can again consist of a plurality of insulated sub-conductors which can be arranged next to one another, above one another or also in a matrix in an individual conductor 3. A multiple parallel conductor having such individual conductors 3 made of sub-conductors is described, for example, in WO 12/113851 A1 or WO 12/113853 A1. Such individual conductors 3 consisting of a plurality of sub-conductors are expressly understood to be individual conductors 3 within the meaning of the invention.

The uppermost and lowermost individual conductors 3 of adjacent individual conductor bundles 2 respectively switch to the relevant adjacent individual conductor bundle 2 at twisting points 4 provided at regular intervals along the longitudinal direction x of the multiple parallel conductor 1, the change occurring in different directions, for example from left to right at the top, and from right to left at the bottom, such that the number of individual conductors 3 in the individual conductor bundle 2 remains the same. This process is well known and is referred to in connection with multiple parallel conductors 1 as twisting, or is referred to in the result as a multiple parallel conductor 1 having twisted individual conductors 3.

For orientation purposes only, the faces having the twisting points 4 are referred to as the upper face and lower face of the multiple parallel conductor 1, and the faces of the multiple parallel conductor 1, which connect the upper face and the lower face, are referred to as side surfaces 5. The side surfaces 5 are usually formed by the narrow faces of the rectangular cross sections of the individual conductors 3, and the upper face and lower face by the long faces of the rectangular cross sections of the individual conductors 3. The designation upper face, lower face and side surface has nothing to do with a specific alignment or position of the multiple parallel conductor 1 and is not to be understood as such.

Figure 2:
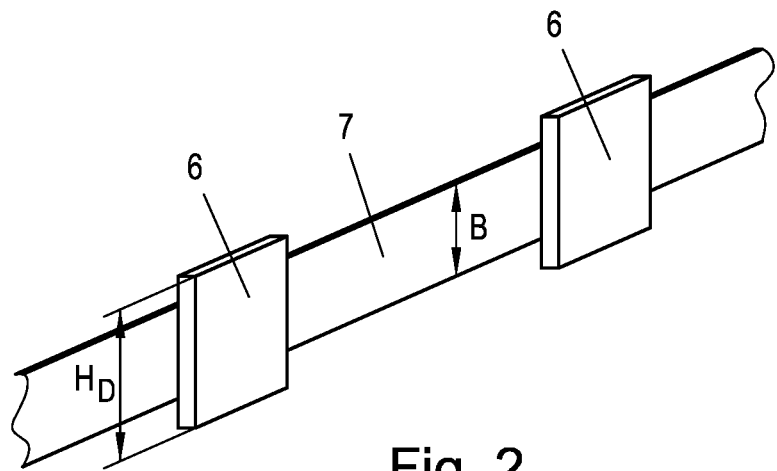
FIGS. 2 and 3 show embodiments of a strip having spacer plates.
Figure 4:
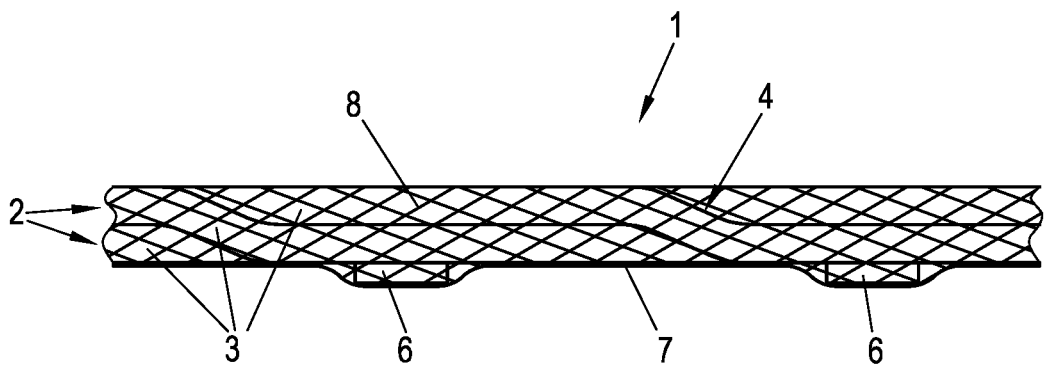
FIG. 4 is a further view of a multiple parallel conductor according to the invention having spacer plates and an external strip.

On at least one side surface 5 of the multiple parallel conductor 1, spacer plates 6 are arranged at predetermined intervals along the longitudinal direction x of the multiple parallel conductor 1 (see also FIG. 4). For this purpose, the spacer plates 6 are fastened to a planar strip 7 and are arranged together with the strip 7 on the multiple parallel conductor 1 during the production of the multiple parallel conductor 1. FIG. 2 shows such a strip 7 having the spacer plates 6 arranged thereon. The strip 7 can be made of any, preferably electrically non-conductive, material, such as plastics material or paper. The strip 7 is preferably flexible.

The spacer plates 6 are made of an electrically non-conductive material, for example pressboard. The manner in which the spacer plates 6 are fastened to the strip 7 is of no importance for the invention, per se, and any suitable method can be used. For example, the spacer plates 6 could be glued to the strip 7.

Likewise, it does not matter whether the strip 7 rests directly on the multiple parallel conductor 1 (as in FIG. 1) or whether the spacer plates 6 rest directly on the multiple parallel conductor 1 and the strip 7 is arranged on the outside (as in FIG. 4).

Figure 3:
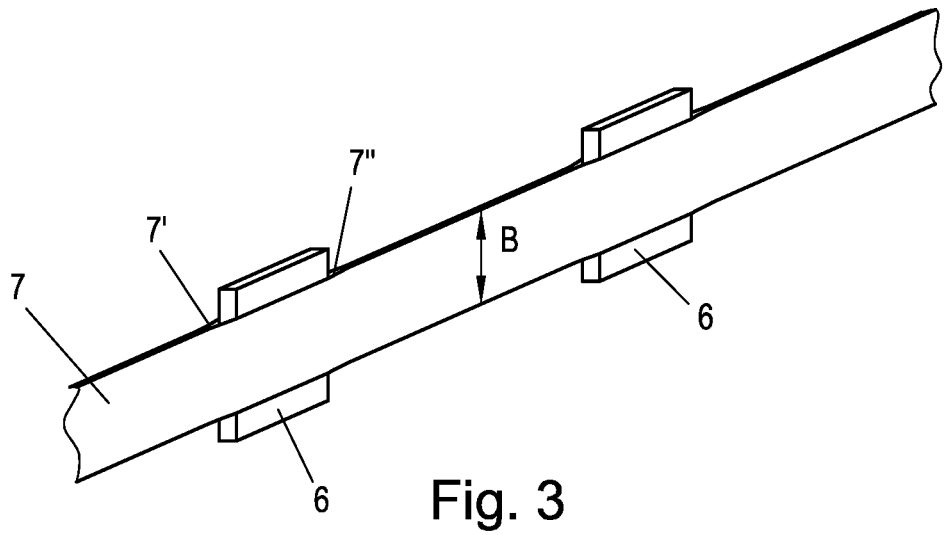

In a further possible embodiment, the strip 7 consists of at least two partial strips 7', 7", between which the spacer plates 6 are arranged, at least one partial strip 7', 7" being arranged on each face of the spacer plates 6 (FIG. 3). The mutually facing faces of the partial strips 7', 7" could in this case be designed to be adhesive, for example in the form of an adhesive paper strip, such that the two partial strips 7', 7" are joined together to form the strip 7 when pressed together, and the spacer plates 6 are fastened between said partial strips at the same time. The facing faces of the partial strips 7', 7" do not necessarily have to be self-adhesive, but the spacer plates 6 can again be fastened between the partial strips 7', 7" in any manner, for example again by means of an adhesive. It is not even necessary for the partial strips 7', 7" to rest against one another.

After the strip 7 has been arranged on the multiple parallel conductor 1, the multiple parallel conductor 1 is provided with a wrapping 8, usually a mesh strip or a paper wrapping, in the usual manner. Although when a mesh strip is used as the wrapping 8, as shown in FIG. 1, a mesh strip which is impregnated with epoxy resin and cured can likewise be used in a known manner, such a mesh strip impregnated with epoxy resin is preferably not used for the wrapping 8.

The height $H_D$ of the spacer plates 6 preferably corresponds to the height $H_L$ of the multiple parallel conductor 1, i.e. the height of the side surfaces 5. After the individual winding turns 10 in a winding of an electrical machine are pressed together in the axial direction of the winding, the adjacent multiple parallel conductors 1 of the winding turns are supported on the spacer plates 6. If the height $H_D$ of the spacer plates 6 were less than the height $H_L$ of the multiple parallel conductor 1, this could lead to a movement of individual conductors 3 in the winding, which could impair or even destroy the function of the winding.

For the same reason, the distance between two spacer plates 6 on the multiple parallel conductor 1 in the longitudinal direction x is preferably planned such that there is always an overlap of the spacer plates 6 lying next to one another in the axial direction in the resulting winding. In this way it can be ensured that the individual winding turns 10 are supported on the spacer plates 6 when the winding is axially tensioned. Since the diameter of the winding turns is known in advance, the arrangement of the spacer plates 6 can easily be planned in advance.

The width B of the strip 7 is preferably selected to be smaller than the height $H_L$ of the multiple parallel conductor 1, but could also be selected to be equal to the height $H_L$ of the multiple parallel conductor 1.

In order to produce the multiple parallel conductor 1, the multiple parallel conductor 1 is first produced in a known manner by twisting the individual conductors 3. The strip 7 having the spacer plates 6 is then placed on the side of the twisted multiple parallel conductor 1 and the wrapping 8 is then attached. The multiple parallel conductor 1 can then be wound onto a drum and thus shipped or supplied for further processing.

The invention claimed is:

1. Multiple parallel conductor comprising a plurality of twisted, insulated individual conductors, the individual conductors being arranged above one another in a plurality of sub-conductor bundles arranged next to one another, wherein a strip is applied to a side surface of the multiple parallel conductor in the longitudinal direction of the multiple parallel conductor, wherein spacer plates are arranged on the strip so as to be distributed in the longitudinal direction, and the multiple parallel conductor with the strip and the spacer plates are wrapped with a wrapping, wherein the strip rests directly on the side surface of the multiple parallel conductor and the spacer plates are arranged on the outside, wherein the height of the spacer plates is greater than the width of the strip, or the spacer plates rest directly on the side surface of the multiple parallel conductor and the strip is arranged on the outside, wherein the height of the spacer plates is greater than the width of the strip, or the strip is composed of at least two partial strips and the spacer plates are arranged between the partial strips, wherein the height of the spacer plates being greater than the relevant width of the partial strips.

2. Multiple parallel conductor according to claim 1, wherein the height of the spacer plates corresponds to the height of the multiple parallel conductor.

3. A method of using the multiple parallel conductor according to claim 1 for producing a winding of an electrical machine, wherein the winding has winding turns which are arranged next to one another in the axial direction of the winding and are spaced apart in the axial direction by the spacer plates, and the spacing of the spacer plates on the strip in the longitudinal direction is selected such that the spacer plates at least partially overlap in winding turns which are arranged next to one another in the axial direction.

4. Method for producing a multiple parallel conductor comprising a plurality of twisted, insulated individual conductors and comprising spacer plates, wherein a strip having spacer plates arranged so as to be distributed in the longitudinal direction is provided wherein a width of the spacer plates being greater than the width of the strip, wherein the strip having the spacer plates is applied to a side surface of the multiple parallel conductor in the longitudinal direction, wherein, the strip rests directly on the side surface of the multiple parallel conductor and the spacer plates are arranged on the outside, or the spacer plates rest directly on the side surface of the multiple parallel conductor and the strip is arranged on the outside, and wherein the multiple parallel conductor, together with the strip and the spacer plates, is then wrapped with a wrapping.

5. Method for producing a multiple parallel conductor with a plurality of twisted, insulated individual conductors and spacer plates, wherein a strip with the spacer plates arranged so as to be distributed in a longitudinal direction is provided, wherein the strip is composed of at least two partial strips and the spacer plates are arranged between the partial strips, wherein the height of the spacer plates is greater than the relevant width of the partial strips, wherein the strip with the spacer plates is applied to a side surface of the multiple parallel conductor in the longitudinal direction, and wherein the multiple parallel conductor with the strip and the spacer plates is then wrapped with a wrapping.

* * * * *